J. GALLAGHER.
EXCAVATOR.
APPLICATION FILED MAY 2, 1911.

1,040,304.

Patented Oct. 8, 1912.

WITNESSES
C. H. Walker
Wm. F. Davidson

INVENTOR
John Gallagher
By Percy H. Moore
Attorney

UNITED STATES PATENT OFFICE.

JOHN GALLAGHER, OF MADISON, WISCONSIN.

EXCAVATOR.

1,040,304.  Specification of Letters Patent.  Patented Oct. 8, 1912.

Application filed May 2, 1911. Serial No. 624,666.

*To all whom it may concern:*

Be it known that I, JOHN GALLAGHER, a citizen of the United States, residing at Madison, in the county of Dane and State of Wisconsin, have invented certain new and useful Improvements in Excavators, of which the following is a specification.

This invention relates to excavators and has for its object to provide a machine of simple construction and high degree of efficiency capable of a variety of uses such as, dredging, excavating and loading sand and dirt on cars or wagons, etc.

Figure 1:
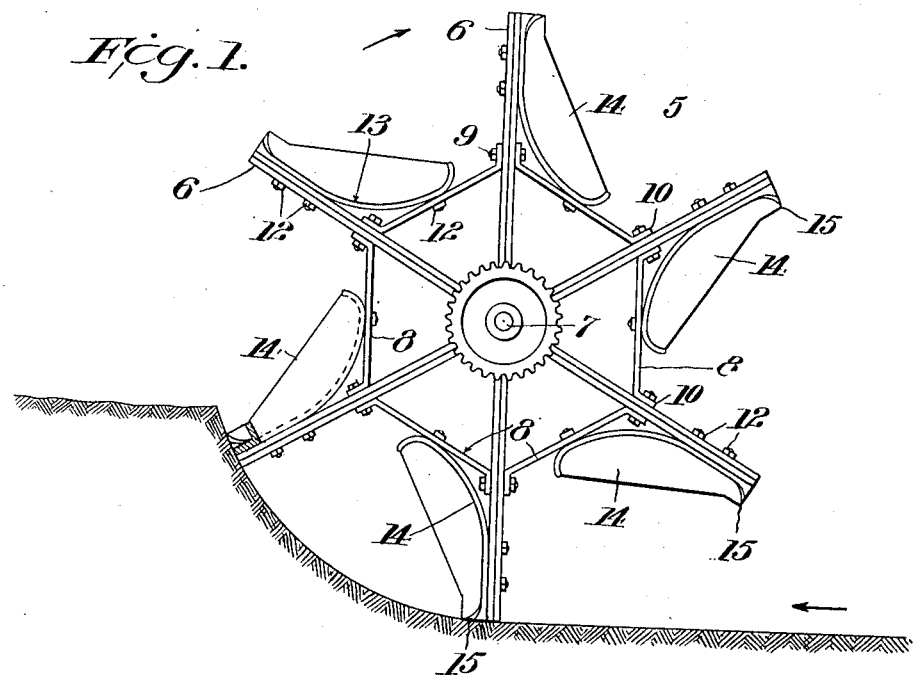
Figure 2:
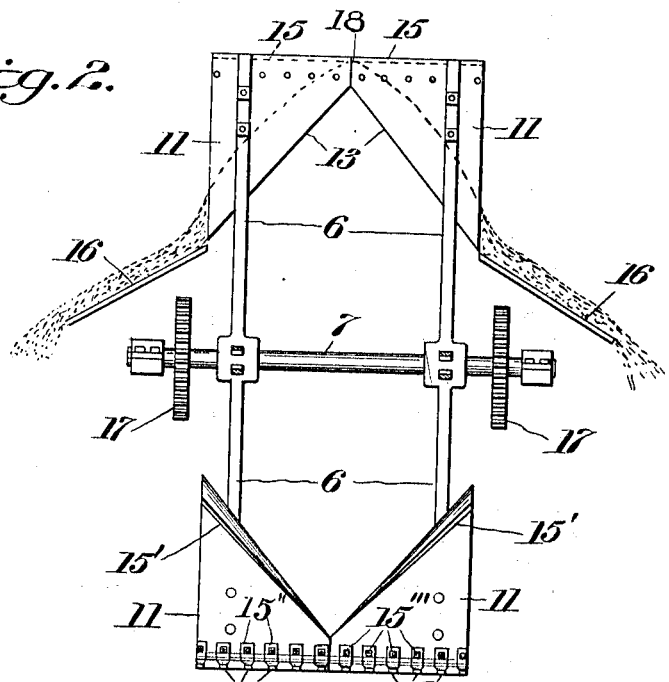

In the drawings, Figure 1 is a side view showing one of the blades or shovels in section, and Fig. 2 is a plan view thereof.

Referring more specifically to the drawings, the numeral 5 represents a rotary cutter wheel comprising a plurality of cutter bars 6 secured to and radiating from a shaft 7, the latter of which may be suitably supported upon the forward end of a traction engine, not shown. The cutter bars 6 are strengthened by brace rods 8 extending between each adjacent pair, having their ends connected together and to the bars 6 by a common bolt 9 passing through apertured lugs 10 on the ends of each brace rod.

11 represents a plurality of blades or shovels, one for each cutter bar, having their inner and outer ends secured to the brace rods 8 and cutter bars 6 respectively by means of bolts 12. These carrier blades which have a curved bottom wall 13, open outer side edges 14 and cutting edges 15 in reality constitute pockets for elevating the dirt or other material to be handled. Inwardly inclined and converging flanges 15' on the blades of each pair form substantially V shaped troughs which serve to deflect the dirt outwardly onto conveniently located chutes 16 on each side of the machine as the wheel is rotated. It will be noted that the flanges 15' terminate a short distance from the cutting edges 15, the blades being provided with straight inner abutting edges 18 extending between the said cutting edges and the end of flanges 15'. While the cutter bars are shown as being arranged in pairs, one on either end of the shaft 7, it is obvious that the cutter bars on one end of shaft 7 may be dispensed with.

Each of the blades 11 is preferably provided with a plurality of fingers 15'' detachably secured thereto as by means of bolts 15'''. These fingers, which are secured to the cutting edge of the blades 11 serve to loosen the dirt and consequently assist the blades or shovels to scoop the dirt up. The shaft 7 is driven by means of gear wheels 7 suitably connected to a source of power, not shown.

From the foregoing description the operation of the invention will be apparent, but may be briefly outlined as follows: The cutter wheel is advanced into position to bring the blades 11 into engagement with the bank or other place from which the earth is to be taken, and the wheel 5 is rotated in the direction of the arrows Fig. 1. As the wheel 5 rotates the cutting edges 15 of the blades 11 scoop up a quantity of dirt, which is carried by the blades around to a point opposite the chutes 16 where the load is dumped. By reason of the inclination of the inner side wall of the blades 11, it follows that as the latter are elevated to the position shown in Fig. 2, the load of dirt carried thereby is caused to glide outwardly onto the chutes 16, from where the dirt may be directed to an endless carrier, not shown.

Having thus described my invention, what I claim is:

In an excavator, a rotary shaft, a plurality of carrier blades on said shaft, said blades having open forward and outer side edges and straight inner abutting edges and provided with inclined flanges extending inwardly from said outer side edges connecting said inner and outer edges and forming a V shaped trough.

In testimony whereof I affix my signature in presence of two witnesses.

JOHN GALLAGHER.

Witnesses:
 JOHN C. McFARLIN,
 C. H. WANAMAKER.

Copies of this patent may be obtained for five cents each, by addressing the "Commissioner of Patents, Washington, D. C."